United States Patent [19]

Lee

[11] Patent Number: 5,765,915
[45] Date of Patent: Jun. 16, 1998

[54] APPARATUS FOR ADJUSTING THE HEIGHT OF THE SEAT CUSHION FOR A VEHICLE

[75] Inventor: Chang Seog Lee, Kyungsangnam-do, Rep. of Korea

[73] Assignee: Hyundai Motor Company, Seoul, Rep. of Korea

[21] Appl. No.: 774,089

[22] Filed: Dec. 24, 1996

[30] Foreign Application Priority Data

Dec. 27, 1995 [KR] Rep. of Korea .................. 95-58255

[51] Int. Cl.[6] .................................................. A47C 7/02
[52] U.S. Cl. .................. 297/344.12; 5/654; 180/272; 307/9.1; 307/10.1; 307/119; 701/49; 297/452.28; 297/452.41; 297/284.6
[58] Field of Search ................. 297/284.1, 284.6, 297/452.41, 452.28, 344.12; 5/713, 654; 180/272; 307/10.1, 9.1, 119; 701/49

[56] References Cited

U.S. PATENT DOCUMENTS

| | | | |
|---|---|---|---|
| 4,306,322 | 12/1981 | Young et al. | 297/284.1 X |
| 4,589,695 | 5/1986 | Isono | 297/284.6 X |
| 4,619,481 | 10/1986 | Grudzinskas | 297/284.1 |
| 4,634,179 | 1/1987 | Hashimoto et al. | 297/284.6 |
| 4,807,313 | 2/1989 | Ryder et al. | 5/713 X |
| 4,966,410 | 10/1990 | Bishai | 297/284.1 |
| 4,993,920 | 2/1991 | Harkleroad et al. | 5/713 X |
| 5,152,579 | 10/1992 | Bishai | 297/284.6 |
| 5,176,424 | 1/1993 | Tobita et al. | 297/284.1 |
| 5,558,398 | 9/1996 | Santos | 297/284.6 X |

*Primary Examiner*—Peter M. Cuomo
*Assistant Examiner*—Stephen Vu
*Attorney, Agent, or Firm*—Christie, Parker & Hale, LLP

[57] ABSTRACT

Disclosed is an apparatus for adjusting the height of the seat cushion for a vehicle which includes a rubber tube positioned under the seat cushion, a pressure sensing means positioned under the rubber tube and moving upward or downward depending upon the load supplied on the seat cushion, a first switch and a second switch selectively operating a compressor and a vacuum pump depending upon a signal from the pressure sensing means, and a limit switch cutting off the first switch on contact with the rubber tube.

5 Claims, 3 Drawing Sheets

APPARATUS FOR ADJUSTING THE HEIGHT OF THE SEAT CUSHION FOR A VEHICLE

BACKGROUND OF THE INVENTION

The present invention relates to an apparatus for adjusting the height of the seat for a vehicle, and more particularly to an apparatus for maintaining a constant height of the seat by using an air tube supplied with compressed air without having relation to the weight of the passenger on the seat.

Generally, automotive vehicles have two front seats and a rear seat mounted on the floor of the vehicle body. Usually the front seat is divided into two seats and the rear seat is bench type which combines two seats into one.

The seats have a seat belt for securing the passenger, and a head rest is mounted on the top of the seat back.

In the prior seat, the height of the seat cushion changes depending upon the weight of the driver, so that the hip point, where the hip of the driver is positioned, varies. If the weight of the driver is heavy, the hip point of the driver is lowered and the posture of the driver becomes unstable.

SUMMARY OF THE INVENTION

Therefore, the present invention is made in an effort to solve the above-described problems of the prior vehicle seat.

It is an object of the present invention to provide an apparatus for keeping up the constant height of the seat without having relation with the weight of the passenger on the seat, so that the boarding feeling of the seat can be increased.

To achieve the above objectives, the present invention provides an apparatus for adjusting the height of the seat for a vehicle including a seat cushion on which the passenger's body can recline and having a head rest which includes a rubber tube positioned under the seat cushion, a pressure sensing means positioned under the rubber tube and moving upward or downward depending upon the load supplied on the seat cushion, a first switch and a second switch selectively operating a compressor and a vacuum pump depending upon a signal from the pressure sensing means, and a limit switch cutting off the electrical contact of the first switch on contacting with the rubber tube.

DESCRIPTION OF THE DRAWINGS

The accompanying drawings, which are incorporated in and constitute a part of the specification, illustrate an embodiment of the invention and together with the description, serve to explain the principles of the invention.

DETAILED DESCRIPTION OF THE INVENTION

Reference will now be made in detail to the presently preferred embodiment of the invention, an example of which is illustrated in the accompanying drawings. Wherever possible, the same reference numbers will be used throughout the drawings to refer to the same or like parts.

Figure 1:
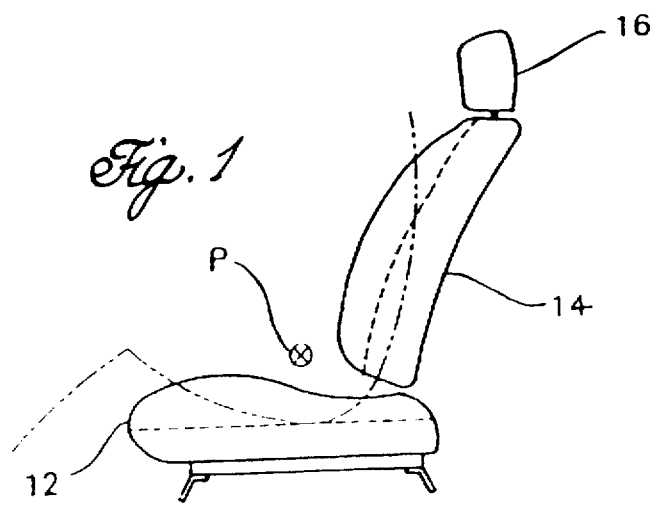
FIG. 1 is a side view of the general front seat for a car.

FIG. 1 shows the construction of the general front seat for a car. The front seat consists of a seat cushion 12 on which a passenger sits and a seat back 14 on which the passenger's body can recline. The angle of the seat back 14 to the seat cushion 12 can be adjusted according to the size of the passenger's body. A head rest 16 is mounted on the top of the seat back 14.

A rubber tube 18 is provided under the seat cushion 12, and a pressure sensing bar 20 is positioned under the rubber tube 18. The pressure sensing bar 20 moves upward or downward and operates a first switch 22 and a second switch 24 depending upon the weight of the passenger. Compressed air is supplied to the rubber tube 18 or discharged to the atmosphere by operation of the first switch 22 or the second switch 24.

Figure 2:
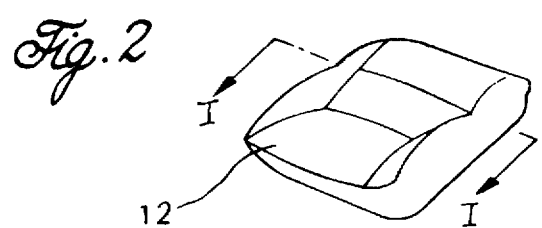
FIG. 2 is a perspective view of the seat cushion according to the present invention.
Figure 3:
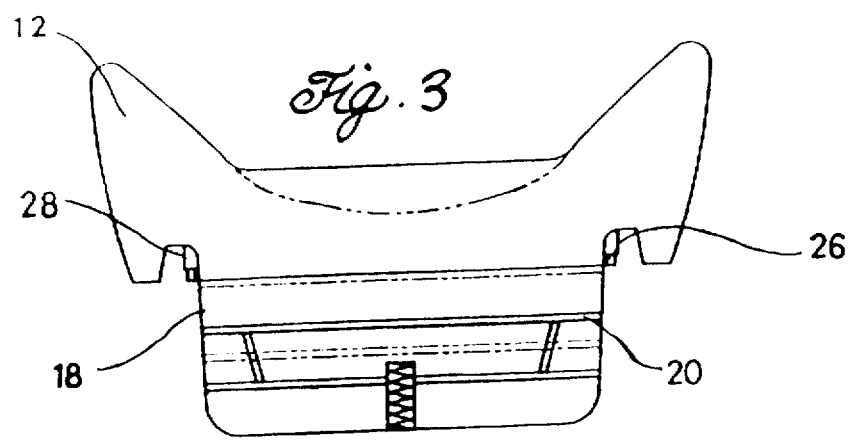
FIG. 3 is a cross section along the line I—I.
Figure 5A:
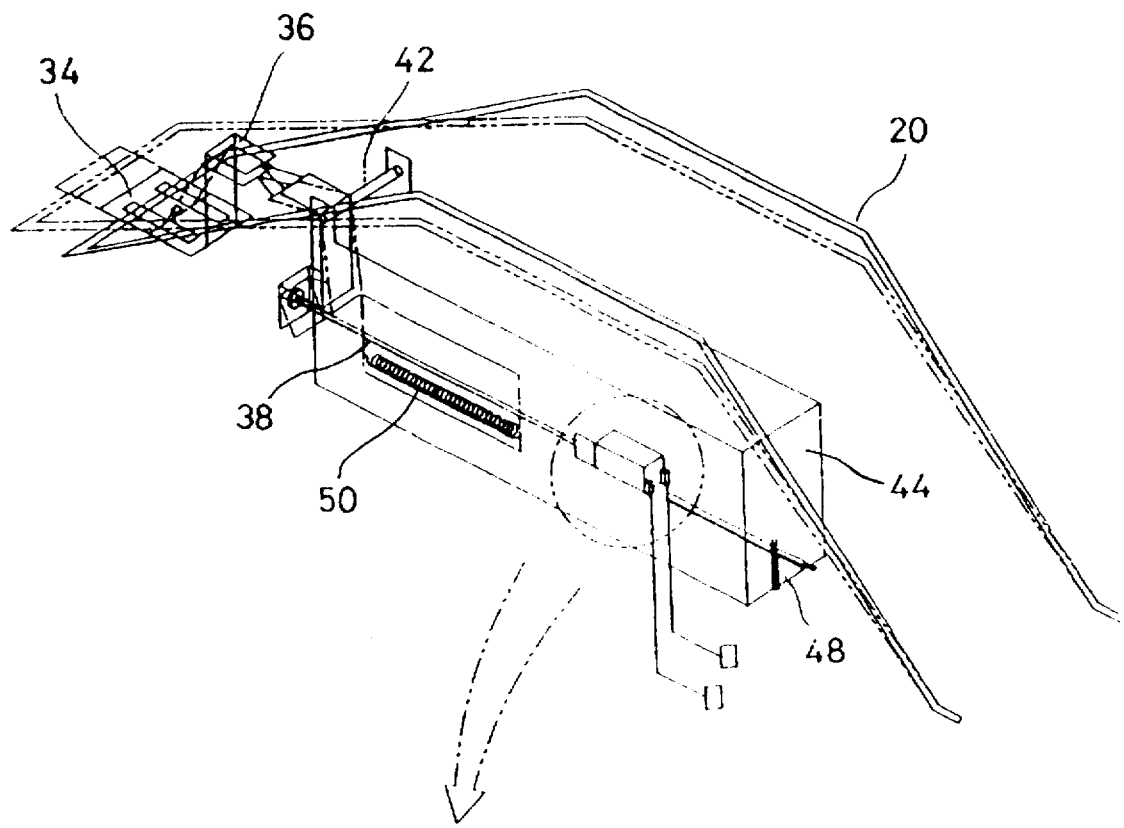
FIG. 5A is a perspective view of the pressure sensing means according to the present invention.
Figure 5B:
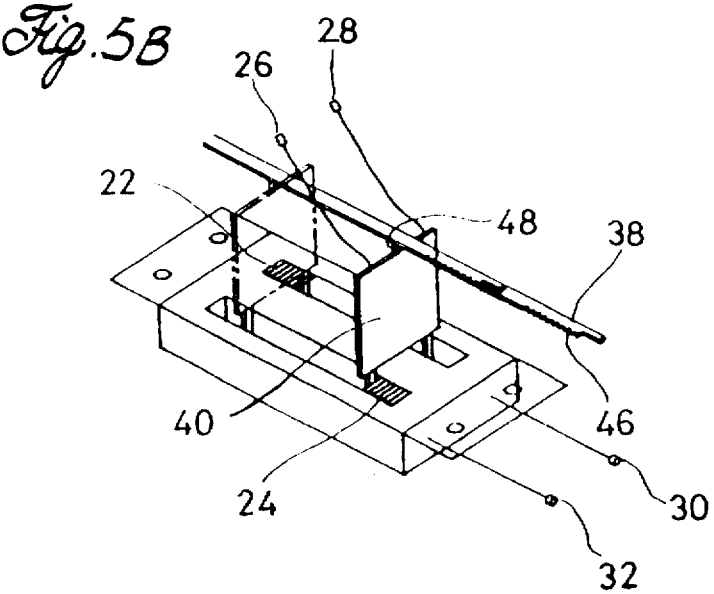
FIG. 5B is an enlarged view of a switch assembly shown in FIG. 5A.

If more than the predetermined load (about 50 kg) is loaded on the seat cushion 12, the pressure bar 20 is moved downwardly as shown in FIG. 2 and FIG. 5 and operates the first switch 22 and the second switch 24. Under the seat cushion 12 are mounted limit switches 26, 28 which automatically turn off the first switch 22, when the rubber tube 18 contacts with the limit switches 26, 28.

Figure 4:
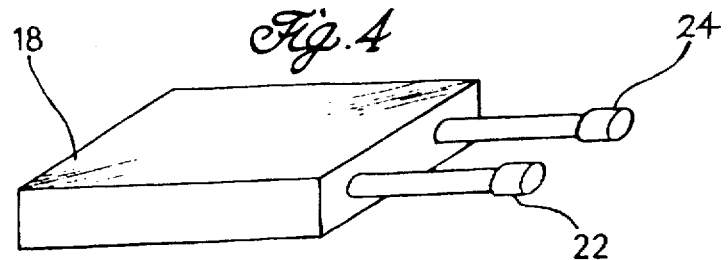
FIG. 4 is a perspective view of the rubber tube according to the present invention.

The rubber tube 18 shown in FIG. 4, swells due to the compressed air supplied from a compressor 30 or shrinks by discharging the air in the rubber tube 18 with a vacuum pump 32, so that the hip point of the seat cushion 12 is maintained at a constant height.

FIG. 5 shows the construction of the pressure sensing means adapted in the present invention, the pressure sensing bar 20, constituting the pressure sensing means, is depicted by the two dot line.

As shown in the FIG. 5, the pressure sensing means consists of the pressure bar 20, a plate 34 moved by the pressure sensing bar 20 and which moves a bracket 36, and a rod 38 which moves with the bracket 36 and operates a pressure plate 40, by which one of the first switch 22 and the second switch 24 can be selectively operated to be turned on.

The bracket 36 is pivotally mounted on a pivot pin 42 provided in a case 44. On the end of the rod 38 are formed teeth 46 which engage with a guide gear 48 mounted on the case 44 pivotally.

Therefore, when the pressure sensing bar 20 moves downward, the bracket 36 turns about the pivot pin 42 and the rod 38 is pulled. The rod 38 moves to the left as shown in the enlarged view of FIG. 5, and the pressure plate 40 contacts the first switch 22. The first switch 22 operates the compressor 32, which supplies compressed air into the rubber tube 18. Then the rubber tube 18 swells and the upper surface of the seat cushion 12 is raised. At this time the guide gear 48 engaged with the teeth 46 guides the movement of the rod 38.

When the rubber tube 18 swells and is raised, the limit switches 26, 28 positioned under surface of the seat cushion 12 contact the rubber tube 18, and the limit switches 26, 28 turn off the first switch 22. Therefore the operation of the compressor is stopped, the compressed air is not supplied into the rubber tube 18.

On the other hand, if the passenger who sat on the seat cushion 12 gets off from the seat, the rod 38 returns to the original position by a return spring 50 which is positioned between the inner wall of the case 44 and the rod 38. Then the pressure plate 40 is contacted with the second switch 24 and the vacuum pump 32 is operated, so that the air in the rubber tube 18 is extracted.

Therefore the rubber tube 18 shrinks and the height of the seat cushion 12 returns to the original point. As the result, the hip point of the seat cushion 12 is always maintained at a constant height.

Figure 6:
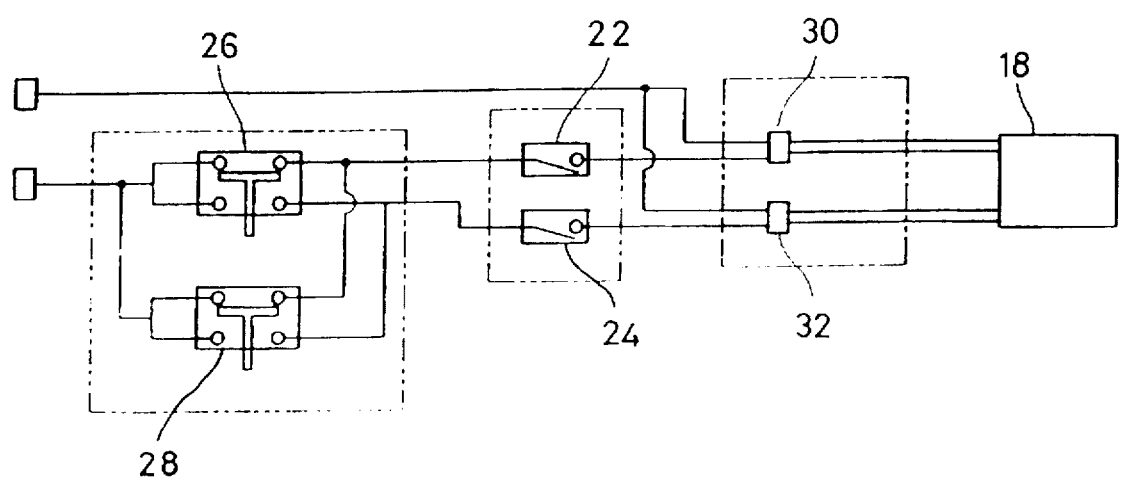
FIG. 6 is an electric circuit for controlling the device according to the present invention.

FIG. 6 shows the control circuit of the preferred embodiment. The control circuit consists of the first switch 22 which operates the compressor 30 suppling the compressed air into the rubber tube 18; the second switch 24 which turns on the vacuum pump 32 extracting the air in the rubber tube 18 when the pressure sensing bar 20 moves upward and contacts the second switch 24; and limit switches 26, 28 turning off the first switch 22 on being in contact with the rubber tube 18.

When the terminal of the limit switches 26, 28 is moved downward, the first switch 22 is turned on and the compressor 30 is operated. Conversely, when the terminal of the limit switches 26, 28 is moved upward, the first switch 22 is turned off and the compressor 30 is stopped and the second switch 24 which operates the vacuum pump 32 is turned on. Therefore the inner pressure of the rubber tube 18 is maintained at a constant level, and the hip point of the seat cushion is always maintained at a constant height.

What is claimed is:

1. An apparatus for adjusting the height of a seat cushion for a vehicle including a seat cushion and a reclinable seat back comprising:

an inflatable rubber tube positioned under the seat cushion;

a pressure sensing means positioned under the rubber tube and moving upward or downward in response to a load applied on the seat cushion;

a first switch selectively operating a compressor in response to the pressure sensing means moving downward past a first position;

a second switch selectively operating a vacuum pump in response to the pressure sensing means moving upward past a second position; and a limit switch positioned on the seat cushion adjacent the rubber tube which cuts off an electrical connection between the first switch and the compressor upon contacting the rubber tube.

2. An apparatus for adjusting the height of a seat cushion for a vehicle including a seat cushion and a reclinable seat back comprising:

an inflatable rubber tube positioned under the seat cushion;

pressure sensing means positioned under the rubber tube and moving upward or downward in response to a load supplied on the seat cushion;

a first switch selectively operating a compressor in response to the pressure sensing means moving downward past a first position;

a second switch selectively operating a vacuum pump in response to the pressure sensing means moving upward past a second position; and a limit switch positioned on the seat cushion adjacent the rubber tube which cuts off an electrical connection between the first switch and the compressor upon contacting the rubber tube, wherein the pressure sensing means comprises:

a pressure sensor bar moving upward or downward in response to the load supplied on the seat cushion;

a plate operatively connected to the pressure sensing bar;

a bracket operatively connected to the plate;

a rod operatively connected to the bracket; and a pressure plate operatively connected to the rod and positioned between the first switch and the second switch, and wherein the pressure plate selectively moves between an electrical connection with the first switch and an electrical connection with the second switch in response to the upward or downward movement of the pressure sensor bar.

3. The apparatus according to claim 2, further comprising a case with an inner wall which houses the pressure sensing means and a return spring positioned between the inner wall of the case and the rod.

4. The apparatus for adjusting the height of the seat cushion for a vehicle according to claim 2, wherein the bracket is pivotally mounted to the case by a pivot pin.

5. The apparatus according to claim 2, further comprising a guide gear pivotably mounted on the case, wherein teeth are formed on the end of the rod, and wherein the teeth engage the guide gear.

* * * * *